United States Patent [19]

Moore

[11] Patent Number: 5,282,736
[45] Date of Patent: Feb. 1, 1994

[54] APPARATUS FOR MANUFACTURING CONTAINERS WITH THICKENED FLANGES

[75] Inventor: Richard L. Moore, Fairhope, Ala.

[73] Assignee: The Lerio Corporation, Mobile, Ala.

[21] Appl. No.: 27,636

[22] Filed: Mar. 8, 1993

Related U.S. Application Data

[62] Division of Ser. No. 914,543, Jul. 16, 1992, Pat. No. 5,227,114.

[51] Int. Cl.⁵ .............................................. B29C 49/20
[52] U.S. Cl. ...................................................... 425/525
[58] Field of Search .............. 425/525, 522, 532, 533; 264/527, 531, 534, 524, 318, 334

[56] References Cited

U.S. PATENT DOCUMENTS

| | | | |
|---|---|---|---|
| 2,977,633 | 4/1961 | Breitenstein | 264/531 |
| 3,004,285 | 10/1961 | Hagen | 264/527 |
| 3,050,773 | 8/1962 | Hagen | 264/534 |
| 3,179,508 | 4/1965 | Stapel | 425/525 X |
| 3,843,005 | 10/1974 | Uhlig | 215/1 C |
| 4,117,062 | 9/1978 | Uhlig | 425/525 |
| 4,170,622 | 10/1979 | Uhlig | 264/520 |
| 4,170,623 | 10/1979 | Dubois et al. | 264/534 |
| 4,177,934 | 12/1979 | Hammes et al. | 220/319 |
| 4,378,328 | 3/1983 | Przytulla et al. | 264/534 |
| 4,409,176 | 10/1983 | Jakobsen et al. | 264/527 |
| 4,495,135 | 1/1985 | White | 264/553 |
| 4,529,570 | 7/1985 | Przytulla | 264/534 |
| 4,640,855 | 2/1987 | St. Clair | 215/31 |
| 4,650,627 | 3/1987 | Peters | 264/529 |
| 4,713,207 | 12/1987 | Udell et al. | 264/515 |
| 4,761,130 | 8/1988 | Peters | 425/532 |
| 4,769,206 | 9/1988 | Reymann et al. | 264/534 |
| 4,842,809 | 6/1989 | Przytulla | 264/530 |
| 4,938,680 | 7/1990 | Guarriello et al. | 425/525 X |
| 4,972,963 | 11/1990 | Guarriello et al. | 220/72 |
| 5,026,268 | 6/1991 | Lee | 425/525 |
| 5,035,604 | 7/1991 | Rathman et al. | 425/55 |
| 5,044,923 | 9/1991 | Przytulla | 425/525 |
| 5,051,084 | 9/1991 | Guarriello et al. | 425/525 |
| 5,202,078 | 4/1993 | Moore | 425/525 X |

FOREIGN PATENT DOCUMENTS 49-45797 9/1974 Japan .
59-152822 5/1984 Japan .
61-100433 4/1986 Japan .

Primary Examiner—Richard L. Chiesa
Attorney, Agent, or Firm—Roylance, Abrams, Berdo & Goodman

[57] ABSTRACT

An apparatus for producing blow-molded containers having thickened flanges. The apparatus utilizes movable mold halves having separable side and end components and a stationary central mold element disposed between the movable mold halves to form containers having thickened radial flanges. The movable mold halves and stationary central mold elements together enclose a mold chamber. After the parison of thermoplastic material has been blow-molded to conform to the mold chamber but while the material is still moldable, the movable mold halves simultaneously move together along the axis of the mold chamber to press the material against the stationary central mold element and thereby fold and bond the material onto itself, forming a thickened radial flange on each container. The flanges are each substantially twice as thick as a single layer of blow-molded material. The thickened flanges may also be formed to each include a thickened axial lip of material extending down from the respective radial flanges. After the thermoplastic material has cooled sufficiently to retain its shape, the side components of the mold halves are axially moved apart so that the mold chamber can be opened along its longitudinal axis without damaging the thickened radial flanges or axial lips. By keeping the end components of the mold halves substantially still during the retraction of the side components of the mold halves, the tail of material formed at the junction of the halves of the molding apparatus opposite to the feed end of the blow-molding chamber is preserved, thereby facilitating post-processing handling of the containers.

10 Claims, 9 Drawing Sheets

APPARATUS FOR MANUFACTURING CONTAINERS WITH THICKENED FLANGES

This is divisional of application Ser. No. 07/914,543, filed Jul. 16, 1992, now U.S. Pat. No. 5,227,114.

BACKGROUND OF THE INVENTION (a) Field of the Invention

The present invention relates, in general, to the formation of containers having thickened flanges. More specifically, the present invention discloses a process and apparatus for manufacturing blow-molded containers having thickened flanges wherein the tail of material formed at the juncture of the halves of the molding apparatus at the bottom of the mold chamber is not separated from the molded containers during formation of the thickened flanges. This tail of material facilitates post-molding handling of the molded containers after they are released from the mold chamber. Containers produced by the inventive process and apparatus are also disclosed.

(b) Description of Related Art

Typically, blow-molding processes call for suspension of a heated tube or parison of thermoplastic material between two mold halves. The mold halves are closed on the suspended parison, then an expanding medium (e.g., air) at super atmospheric pressure is introduced into the parison. Alternatively, the mold may be evacuated, i.e., via vacuum, or both blow-molding pressure and vacuum may be combined so that the material of the parison eventually conforms to the contour of the mold. The mold is generally much cooler than the thermoplastic material, and hence, the thermoplastic material becomes rigid or "sets" after being in contact with the mold for a short period of time. Once the thermoplastic material sets, the halves of the molding apparatus are opened and the part is removed.

Owing to the particular qualities of previously-known blow-molding process, the open-top containers produced thereby have normally not possessed a very rigid rim or top section. This has been particularly true with those containers with continually outwardly and upwardly tapering side walls wherein the top or rim constitutes the largest part of the container. In order to augment the strength of the top rim, conventional containers have been formed having an annular projection at the top thereof; the projection having a generally channel-shaped or multiple channel shaped cross section. This channel-shaped cross section, although beneficial, often does not provide the rigidity required in many applications. Furthermore, the channel shaped section is located at the largest radial dimension of the mold where parison stretch is the greatest. For example, U.S. Pat. No. 4,972,963 to Guarriello et al. discloses a blow-molded article with a reverse lip. As shown in FIG. 3, the "reversed lip" refers to a generally U-shaped member which, by its shape, provides somewhat increased strength to the top of the container. The reversed lip has the same thickness as the rest of the container, however, i.e., one layer of blow-molded material.

In order to provide flanges having strength beyond the limits possible with a single thickness of blow-molded material, a variety of methods for producing thickened flanges have been developed. For example, in U.S. Pat. No. 4,713,207 to Udell et al. a process for producing blow-molded containers (e.g., drums) having thickened flanges and/or chimes is disclosed. The process calls for a ring of extrudate (E) to be placed in the mold before the parison (P) is extruded into the mold chamber. In this way, as the parison is blow molded, the extrudate (E) and parison (P) materials may bond together.

Placing two different materials within the mold chamber is time consuming and expensive, however. Therefore, other processes have been developed which form a thickened flange from a single parison of material. For example, U.S. Pat. No. 4,117,062 to Uhlig discloses a process for producing containers (e.g., drums) having thickened chimes and/or flanges. In this process, the mold chamber is configured to keep certain parts of the blow-molded container warmer than others (i.e., those sections which will be refolded). After the parison of thermoplastic material has been expanded, the desired portions of material are refolded to form flanges/chimes by axially moving the ring (26) (see, FIG. 3-7). It does not appear that the layers of blow-molded material bond together after being folded over, however, and the simultaneous formation of two containers is not disclosed.

In other processes, the folded over layers of blow-molded material are substantially fused together, thereby increasing the strength of the flange. For example, in U.S. Pat. No. 3,843,005 to Uhlig (which is hereby incorporated by reference), the folded over layers may be bonded together by residual heat (see, e.g., column 11, lines 33-37). In this process (as is common in the prior art), however, the thickened flange (e.g., bottom support wall (99) in FIG. 3) is formed by moving one major mold section relative to another (e.g., plates (84) in FIGS. 15-17) in an axial direction, thereby moving a substantial portion of the mold and container. Since the molds are often quite heavy, this movement can be energy-intensive and wasteful. Furthermore, as shown in FIGS. 15-17, moving the major mold components often severs the "tail" (85) of thermoplastic material pinched between the mold sections. Severing the tail (85) is detrimental since this makes it more difficult to handle the container after it is released from the mold without marring its surface.

Other processes have been developed wherein thickened flanges are formed by the movement of major mold sections. For example, U.S. Pat. No. 5,026,268 to Lee discloses an apparatus for forming blow-molded containers having thickened flanges by folding over the thermoplastic material. The blow-molded material is folded over by the sequential motion of three longitudinally-arranged major mold sections (36, 38, 40). The central mold section (38) does not remain stationary during the molding process and, since one thickened flange is molded before the other, flange uniformity is difficult or impossible to attain.

Finally, U.S. Pat. No. 5,051,084 to Guarriello et al. discloses a reverse lip blow molding apparatus. In Guarriello et al., the mold walls (42) move simultaneously toward the center rings (34, 34'). First (46) and second (48) insert members are used to form thickened extension flanges (23). In Guarriello et al., however, the flanges are not thickened along the whole width thereof and a thickened, unitary axial lip does not appear to be formed (see, FIG. 3). Also, Guarriello et al. appears to call for the "pinch-off plates" (i.e., at the bottom and top of the mold chamber) to be ridgedly affixed to the mold walls (42) (see, column 3, lines 61-65).

While these methods are capable of producing very useful containers, the problem of producing blow-molded containers having thickened flanges with thickened axial lips, the layers of which reliably bond together, without relying upon retraction of the major mold sections at the top and bottom of the mold chamber to effect part release from the mold chamber has remained. Furthermore, the corollary problem of post-release (i.e., from the mold chamber) handling of the container also remains unsolved, i.e., in light of the tendency of present processes to remove the "tail" of extruded thermoplastic material pinched between the mold sections.

SUMMARY OF THE INVENTION

The inventive process and apparatus solve the problems and suboptimizations of the prior art by producing an open-top container which has a body portion, a radially outwardly extending thickened flange disposed at the top of, and integral with, the body portion of the container and a thickened axial lip extending down from the radial flange. The containers are blow-molded two per mold in a mold which has two movable mold halves and a stationary central mold element disposed therebetween. Each of the movable mold halves is further subdivided into separable side and end components. The movable mold halves provide two chambers which substantially conform to the body and bottom of each container.

The movable mold halves together with the fixed central mold element define annular recesses within the mold chamber, one per container, within which an intermediate portion of thermoplastic material is formed during the blow-molding operation. Each annular recess formed has two radially outwardly-extending section, the upper section (i.e., with respect to the sidewall of the container) being defined by the fixed central mold section and the lower outwardly-extending section being defined by the respective movable body/side elements of the movable mold halves. The radially-outermost ends of the radial sections are connected by an annular section defined by the fixed mold section.

After the plastic material has conformed to the mold chamber, but while it is still flowable, the movable mold halves (i.e., the side/body and bottom components thereof) move axially and simultaneously together, toward the fixed central mold element, causing the outwardly-extending radial sections of material to press together—forming a thickened radial flange with an integral thickened axial lip at the radially-outermost edge thereof.

Once the molding operation is complete, the thickened radial flanges and axial lips have been formed and the plastic is no longer flowable, the movable side mold elements of the mold halves move axially away from the fixed center mold element and axially toward the movable bottom (i.e., with respect to each of the two containers formed per process cycle) mold elements (which remain in the closed position). This movement allows the container to be released from the mold chamber with the pinch tab or tail (i.e., the material captured when the halves of the molding apparatus were axially closed—before the parison was blow-molded) still attached to the container. The pinch tab provides an excellent means for automated part/container removal from the mold chamber/molding machine—e.g., by mechanical fingers grasping the tab prior to the mold opening, and then removing the containers after the mold is opened—e.g., for placement in a secondary trim machinery. Prevention of premature separation of the tab (i.e., by the motion of the mold elements required to form the flange) is very beneficial in insuring smooth part removal and subsequent automated finishing.

BRIEF DESCRIPTION OF THE DRAWINGS

For purposes of illustrating the invention, there is shown in the drawings a preferred form of the present apparatus, process and resultant article of manufacture. It is to be understood, however, that the invention is not limited to the precise arrangements and instrumentalities shown.

DETAILED DESCRIPTION OF THE PREFERRED EMBODIMENT

Figure 9:
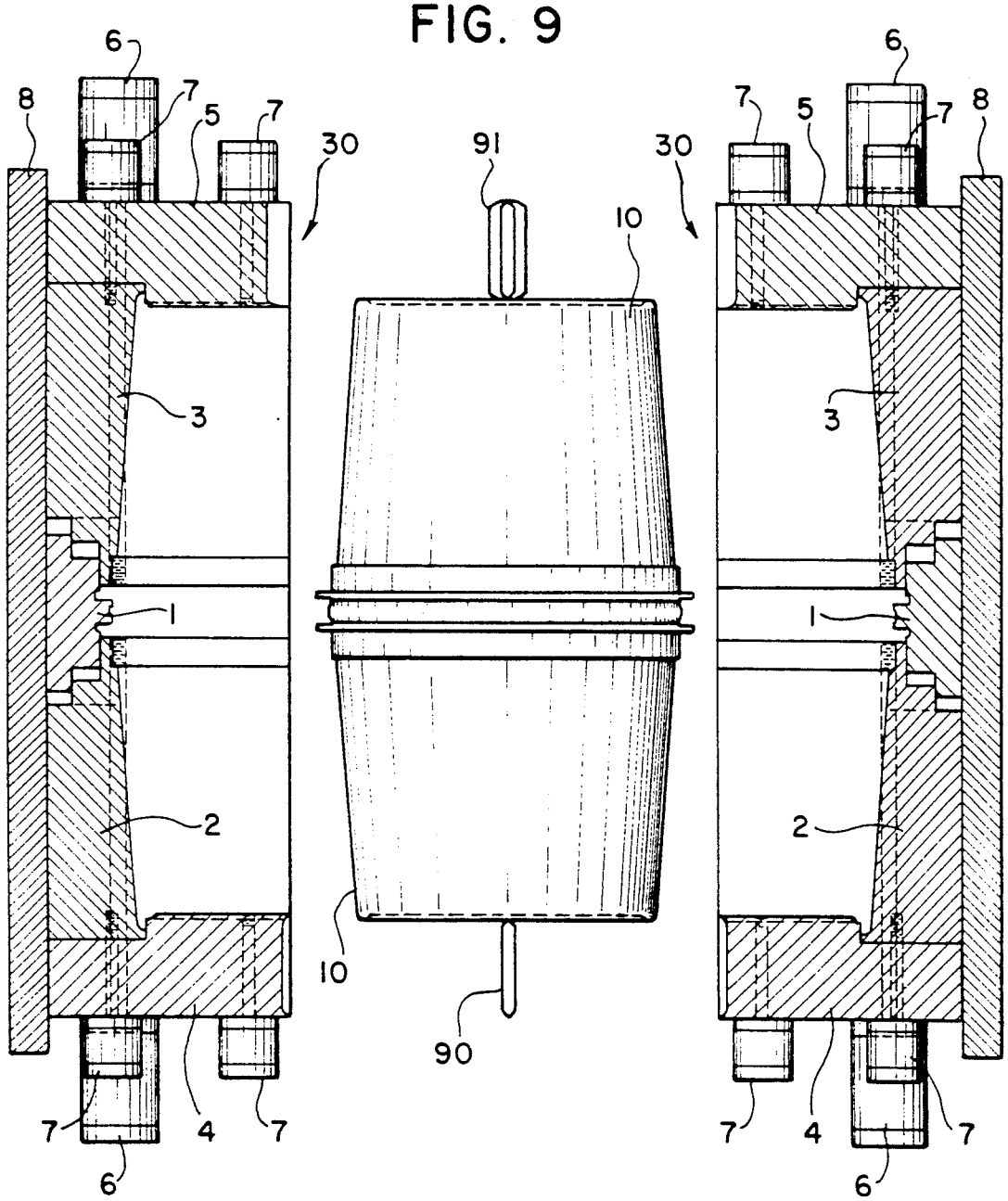
FIG. 9 is a side elevational view in cross section taken along line 3—3 of FIG. 1 (i.e., perpendicular to parting line 2—2) showing the halves of the mold apparatus axially separated along the parting line 2—2 and the joined pair of molded containers ready for removal from the mold chamber with the top and bottom pinch tabs/tails still attached.

Referring to the drawings, wherein like numerals refer to like elements throughout, there is shown in FIG. 9 a pair of joined containers 10 made by the present process and apparatus. The container 10 may be formed from any suitable thermoplastic material (e.g., especially polyethylene) and may be formed in any suitable general configuration (e.g., round, square, etc.—preferably, however, generally cylindrical containers are formed). The container 10 may also be formed in a wide variety of sizes, e.g., from flower pots having a top opening of two inches square to containers for trees capable of holding several cubic feet of soil and plant material. As is known in the art, the container 10 may advantageously be formed to include ribs for strengthening the container sidewall and a raised bottom to facilitate water drainage from the container. In the case of flower pots, it may also be helpful to include holes in the bottom of the container 10 to facilitate drainage of excess water.

(a) Apparatus

Figure 1:
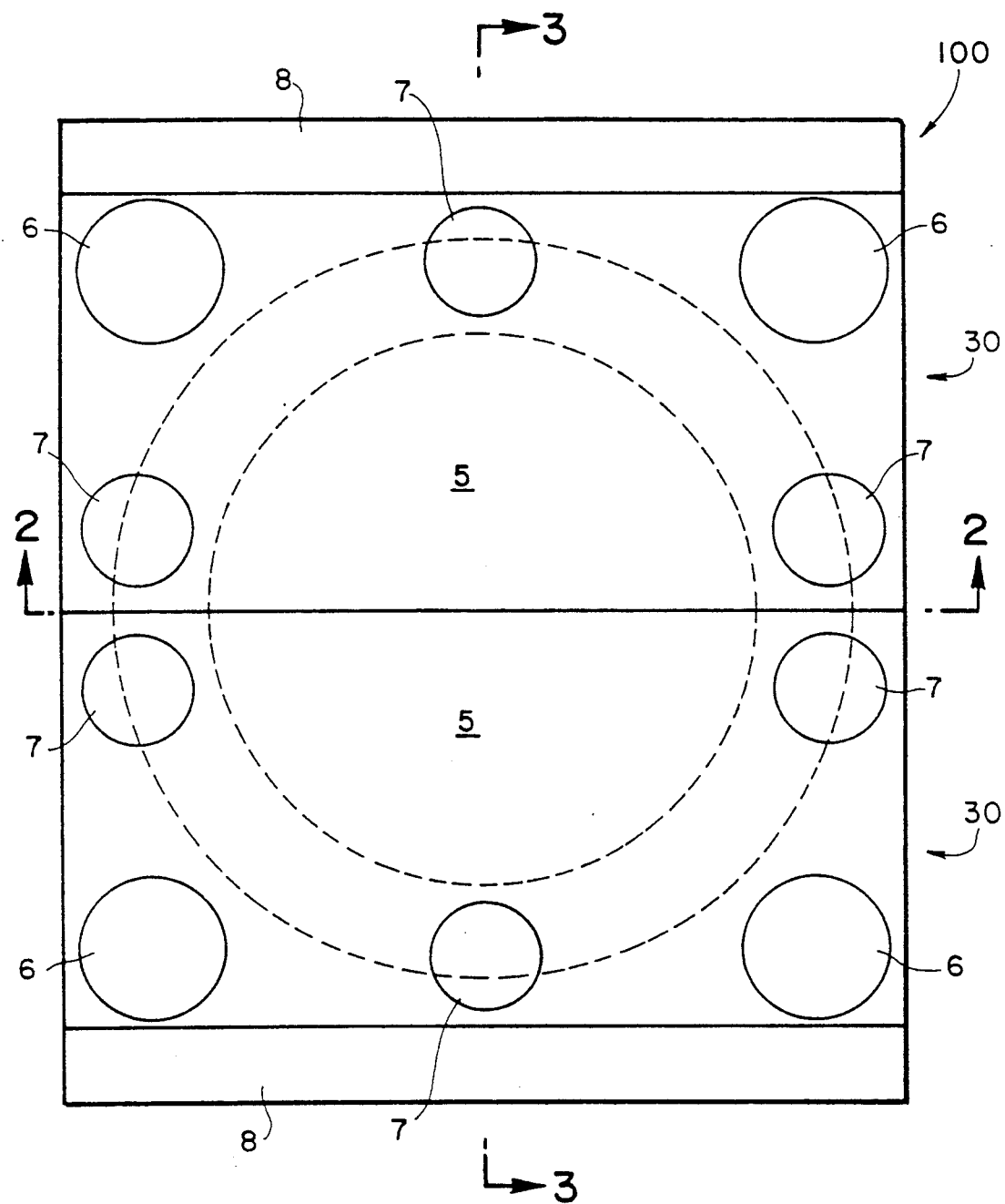
FIG. 1 is a top plan view of a mold apparatus suitable for making a pair of joined containers showing parting line 2—2, i.e., the line along which the molding apparatus/mold chamber opens axially to allow a new parison of thermoplastic material to be introduced therein at the beginning of a process cycle.

The apparatus 100 used to produce the inventive containers 10 is similar to previously-known blow-molding apparatuses in that the mold apparatus 100 is divisible along its longitudinal axis (i.e., along parting line 2—2 in FIG. 1; see also FIG. 9) whereby the mold apparatus 100 may be opened to allow a parison of flowable thermoplastic material therein. As the two axial halves 30 of the molding apparatus 100 close around the thermoplastic material, they create an enclosed mold chamber 50 and pinch a residual "tail" of thermoplastic material therebetween. A tail, or pinch tab 90 of material is almost always created at the juncture of the halves of the molding apparatus 30 at the end of the mold chamber 50 opposite to the end through which the parison of thermoplastic material is introduced (i.e., at the bottom of the mold chamber 50). A second tail of material 91 is also often formed at the top of the mold chamber 50. In the previously-developed devices, this "tail" of material is normally separated from the containers during processing/flange formation. In the present invention, however, as will be discussed in further detail hereinafter, the tail 90 (or tails 91) of material pinched between the halves of the mold apparatus 30 is maintained during processing and facilitates post-processing removal of the containers 10 from the mold chamber 50 and allows the molded containers 10 to be handled without marring the sides thereof.

The components of the molding apparatus 100 enclosing the mold chamber 50 help to cool and "set" the thermoplastic material after it is brought into contact therewith (i.e., by blow-molding, vacuum, or a combination thereof). Therefore, the mold components (i.e., the top 5, bottom 4 and side/body elements 2,3 of the respective mold halves 20 and the central fixed section 1) are preferably made of highly heat-conductive material, e.g., aluminum. More preferably, the primary mold components (e.g., the mold components substantially forming the sides 2, 3 and bottoms 4, 5 of the molded containers) include internal tubing or drilled or molded passages for conveying cold water (or other fluids, e.g., glycol) therethrough to further facilitate the cooling process.

As noted above (see also, FIGS. 1 and 9), the major mold components are preferably separable along a longitudinal (relative to the containers being formed therein) axis (i.e., the mold chamber 50 is axially divisible along parting line A—A). In this way, the two halves 30 of the mold apparatus 100 are both openable to allow a parison of thermoplastic material to decend therebetween (e.g., from an extruder or other suitable means for producing blow-moldable/moldable thermoplastic material, as known in the art), and closable to capture the tail 90 of material between the halves of the molding apparatus 30 (i.e., at the end of the mold chamber 50 opposite to the side through which the parison of the thermoplastic material enters the mold chamber 50—a second tail/pinch tab 91 of material may also be captured at the end of the mold chamber 50 through which the parison enters—see, FIG. 9).

Figure 2:
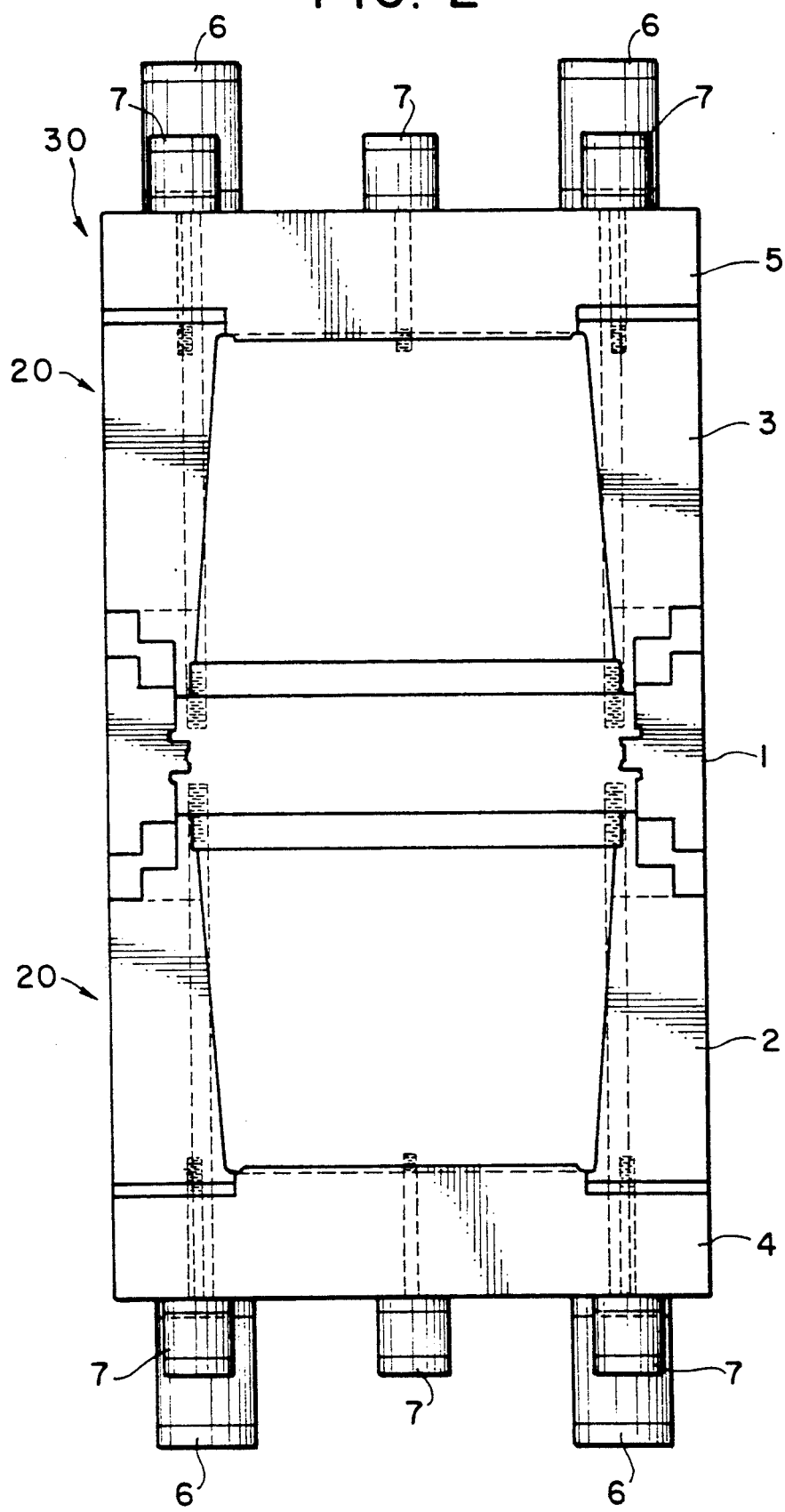
FIG. 2 is a side elevational view of the mold apparatus and chamber along parting line 2—2 of FIG. 1 showing a first set of hydraulic cylinders 6 (i.e., cylinders connecting the bottom 4 and top 5 elements of the movable mold halves to the fixed central mold element 6) fully extended and a second set of hydraulic cylinders 7 (i.e., connecting the bottom 4 and top 5 elements of the movable mold halves to the respective side elements 2, 3 of the movable mold halves) fully extended.

The halves of the molding apparatus 30 are also divisible along the latitudinal plane (i.e., relative to the containers 10 being formed within the mold chamber 50). For example, as seen in FIG. 2, each half of the molding apparatus 30 is divisible along its length into two molding halves 20 (i.e., and hence, a complete molding apparatus 100 comprises four mold halves 20—two for each of the two containers 10 molded per molding cycle—and two mold halves 20 for each of the two halves 30 of the molding apparatus 100). Each mold half 20 comprises a top 5 or bottom 4 mold section (since both top 5 and bottom 4 mold sections correspond to the bottom of one of the pair of molded containers 10 molded per process cycle, both top 5 and bottom 4 mold elements of the movable mold halves may also be referred to generically as "bottoms"), a corresponding side or body mold section (3 or 2, respectively) and at least a portion of the stationary central mold section 1. The stationary central mold sections 1 are fixed to backing plates 8 (see, FIG. 1), but (as will be further described hereinafter in the course of describing the inventive process, the other mold sections (e.g., bottoms 4, 5 and sides 2, 3 mold elements) are not rigidly affixed to the backing plates 8.

In the present invention, the goal of producing a container (e.g., flower pot) with thickened (and strengthened) flanges 60 is achieved by axial (i.e., longitudinal) movement of the components of the movable mold halves 20 (i.e., the top 5, bottom 4 and respective side/body 3, 2 mold components). Furthermore, in the inventive process, the side/body 2, 3 mold elements can move separately from their respective corresponding bottom 4, 5 elements of the movable mold halves. This distinction over the prior art allows the tail of material (e.g., 90, and potentially also 91) formed between the halves of the molding apparatus 30 to normally remain attached to the containers 10 during formation of the thickened radial flanges/thickened axial lips and, once the containers 10 have been released by the molding elements, facilitates removal of the containers 10 from the mold chamber 50 and post-molding processing. This is in contrast to many previously-known processes, e.g., U.S. Pat. No. 3,843,005 to Uhlig (discussed above and hereby incorporated by reference) wherein the tail of material is usually detached from the container by the movement of the major mold sections during flange formation.

The movement of the top 5 and bottom 4 elements within the movable mold halves 20 relative to the stationary central mold section 1 is controlled by a first set of hydraulic cylinders 6. Clearly other suitable means for moving the mold elements relative to each other may be utilized, but hydraulic cylinders have proven to be quite useful. In order to effect appropriate movement of the top 5 and bottom 4 mold elements relative to the fixed central mold element 1, the first set of hydraulic cylinders 6 must span the top 5 and bottom 4 mold elements (see, e.g., FIG. 2). More preferably, however, the first set of hydraulic cylinders 6 comprise two sets of cylinders which run from above the top 5 mold element to the fixed central mold element 1 and from below the bottom 4 mold element to the fixed central mold element 1 respectively (e.g., as shown in FIG. 2 wherein the threads of the two groups of cylinders within the first set of hydraulic cylinders 6 can be seen to terminate within stationary central mold element 1). This structure facilitates the desired simultaneous movement of the movable mold halves 20 toward the fixed central mold element 1. This simultaneous molding of the thickened flanges 60 for each of the two containers 10 facilitates production of two sets of uniform flanges (i.e., one thickened flange 60 per container). In processes using sequential molding of the thickened flanges (e.g., U.S. Pat. No. 5,026,268 to Lee), on the other hand, the second-formed flange can often be thinner than the first-formed flange (e.g., because the blow-molded material is further stretched during the formation of the first flange—leaving less material to form the second flange and because the reduction in the mold chamber volume caused by the molding of the first flange can subject the remaining blow-molded material to elevated pressure, and hence, additional stretching).

Figure 3:
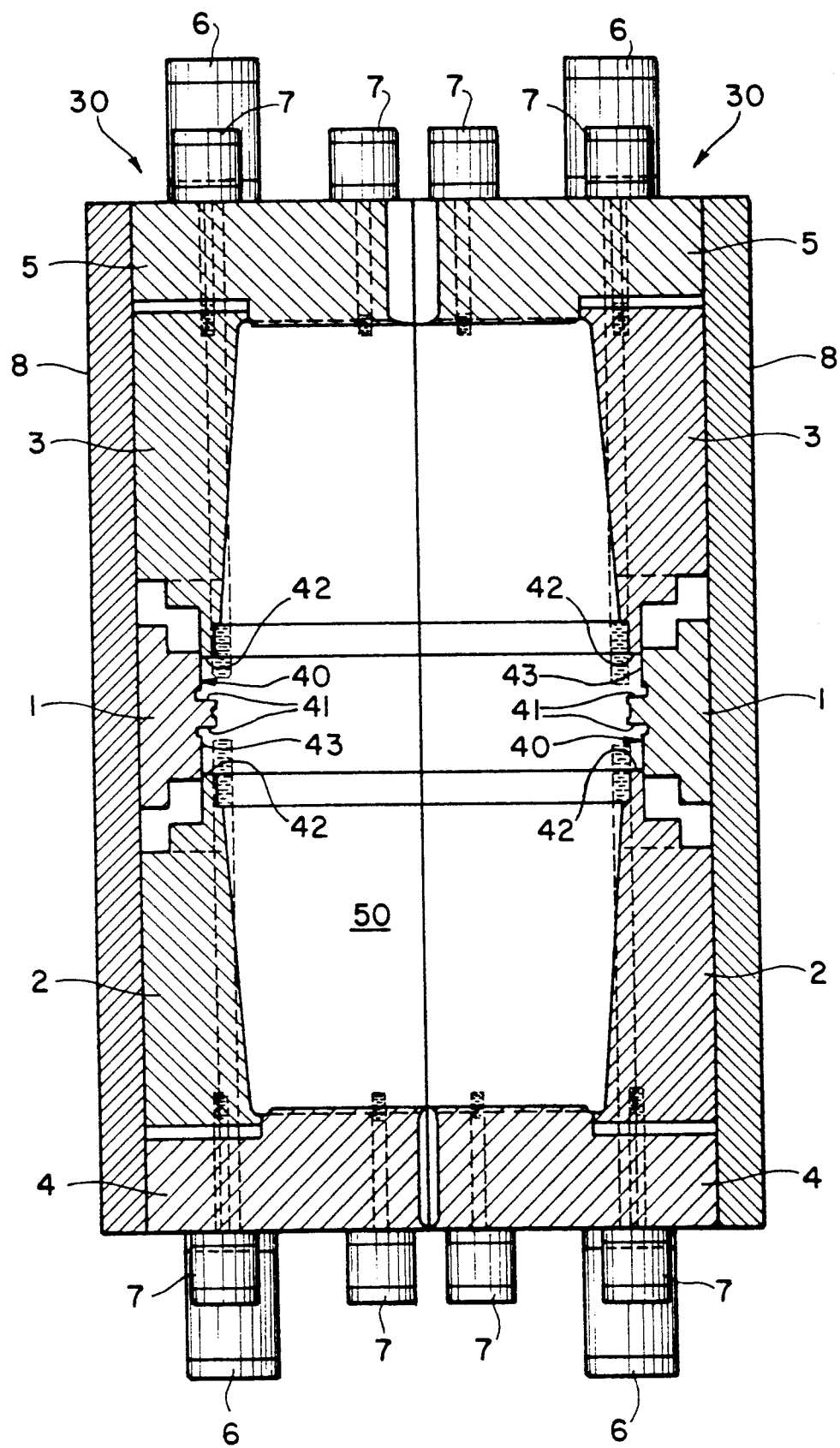
FIG. 3 is a side elevational view in cross section along line 3—3 of FIG. 1 with the molding components in the same position as in FIG. 2.

The movement of the side/body elements 2, 3 of the movable mold halves 20 relative to the corresponding bottom 4 and top 5 mold elements is preferably controlled by a second set of hydraulic cylinders 7. As with the first set of hydraulic cylinders 6, other means for moving the mold elements relative to each other may be used in some situations (e.g., pneumatic cylinders, mechanical pistons or chains, etc.), but hydraulic cylinders have proven to be an excellent method for effecting the required movement of the mold sections. As will be clear to those skilled in the relevant molding art, the precise types of hydraulic equipment utilized as the first 6 and second 7 sets of hydraulic cylinders may vary widely according to the size and type of containers being molded. As seen in FIGS. 2-5 and 7-9, the second set of hydraulic cylinders 7 connect the side/body 2, 3 elements of the movable mold halves 20 to the corresponding bottom 4, 5 elements of the movable mold halves 20. As will be discussed further hereinafter in the course of describing the inventive process, preferably neither the first 6 nor second 7 set of hydraulic cylinders are rigidly affixed to the backing plates 8 (i.e., rather, the hydraulic cylinders 6, 7 are free to move axially with the top 5 and bottom 4 elements of the movable mold halves 20). As shown in FIGS. 2 and 3 versus FIGS. 7 and 8, the top 5 and bottom 4 elements of the movable mold halves 20 are preferably configured relative to the respective side/body mold elements 3, 2 to allow the second set of hydraulic cylinders 7 to retract the side/body mold elements 3,2 therein somewhat.

Figure 6:
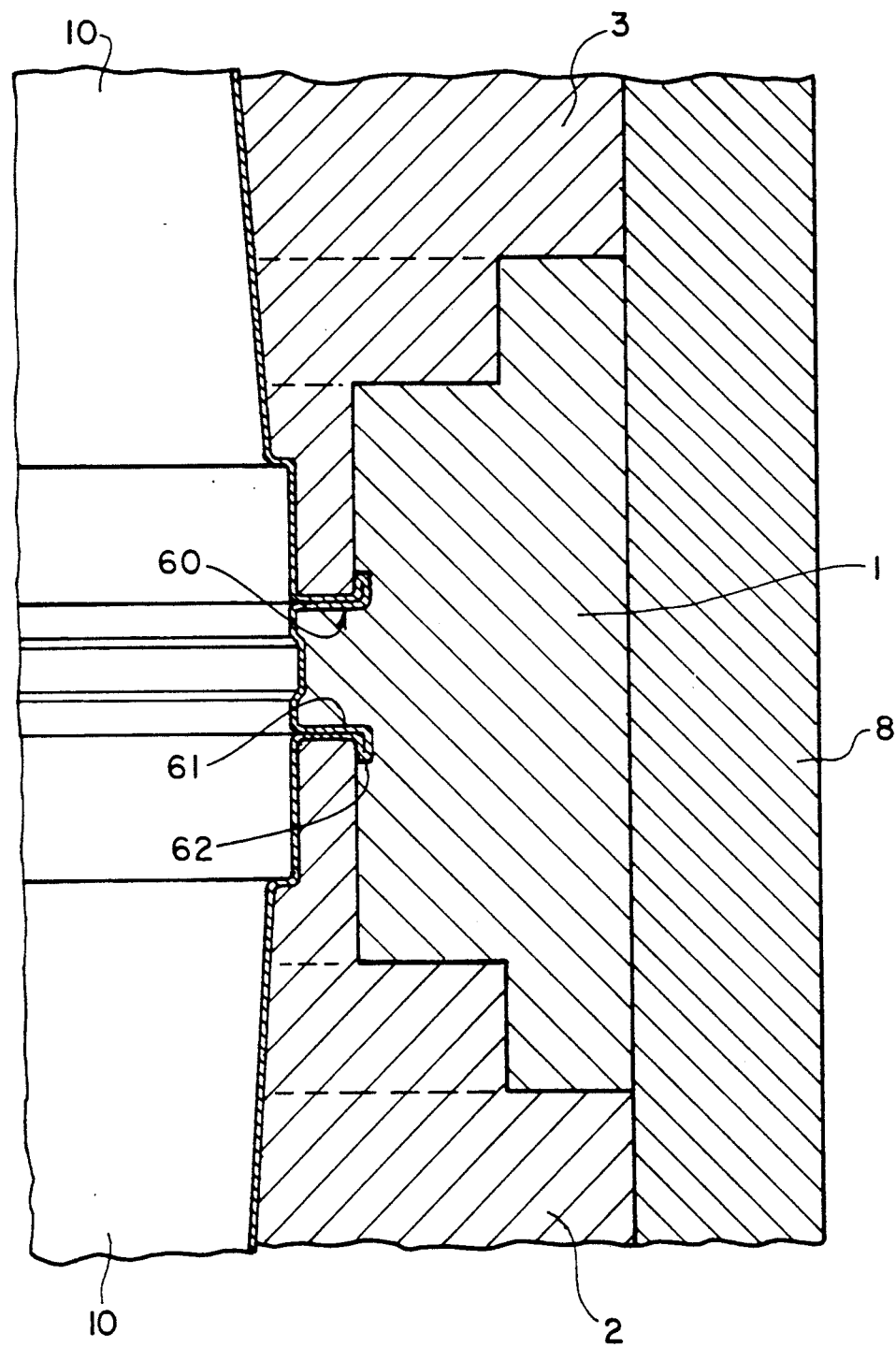
FIG. 6 is a fragmentary view in cross section of the mold apparatus as per FIG. 5 showing the formation of a thickened radial flange and an axial lip on each of the joined pair of containers.

As seen in FIG. 6, the side/body elements 2, 3 of the movable mold halves 20 are configured with respect to the fixed central mold element 1 whereby sufficient space is left therebetween for a substantially double-thickness flange 60 to be formed during the inventive molding process. The thickened flange 60 of each container preferably comprises a radial flange 61 and an axial lip 62. Both the radial flange 61 and axial lip 62 portions of the thickened flange 60 are preferably about double a single thickness of blow-molded material.

The junction between the side elements 2, 3 of movable mold halves 20 and the stationary central mold element 1 can be varied widely depending upon the desired configuration of the molded thickened flanges 60. Preferably, however, the side/body elements 2, 3 of the movable mold halves 20 are configured relative to the stationary central mold elements 1 whereby (at the first stage of the inventive process—as will be discussed more fully hereinafter—see, FIG. 3) an intermediate portion of thermoplastic material 40 will be formed at the juncture of the side elements 2, 3 of the movable mold halves 20 and the stationary central mold element 1. These intermediate portions 40 of blow-molded material (one for each container) will subsequently form the pair of thickened flanges. As shown in FIG. 3, each intermediate portion of material 40 preferably comprises an upper radial portion 41 (comprising the thermoplastic material overlying the stationary central member 1), a lower radial portion 42 (comprising the thermoplastic material overlying the respective side/body elements 2, 3 of the movable mold halves 20), and an annular portion 43 joining the two radial portions 41, 42 (and comprising the thermoplastic material overlying the annular portions of the stationary central member 1 between the two radial portions 41, 42). As will be fully described hereinafter in the course of describing the inventive process, the excess thermoplastic material constituted by the intermediate portions 40 (i.e., relative to subsequent steps of the molding process, during which the side 2, 3 mold elements and stationary central mold element 1 are brought together) will subsequently form the thickened flanges 60.

(b) Process

In the inventive process, a tube or parison of thermoplastic material is introduced into the space between the halves of the molding apparatus 30 (e.g., by extrusion or any other suitable method). A variety of thermoplastic materials may be utilized, but polyethylene has proven to be quite useful. At the time of extrusion, the thermoplastic material (e.g., polyethylene) is typically at about 350° F. Thereafter, the halves of the molding apparatus 30 are closed around the parison of material (i.e., along parting line 2—2 of FIG. 1—see also, FIG. 9), thereby capturing a tail of material at the junction of the halves of the molding apparatus 30 at the bottom thereof 90 (a second tail or pinch tab 91 of material may also be captured at the top of the molding chamber 50). Thereafter, the thermoplastic material is expanded (e.g., by blow-molding, vacuum, or a combination thereof—more preferably, by blow-molding) to fill the mold chamber 50. The thermoplastic material comes in contact with the bottom 4 and top 5 and side/body 2, 3 mold elements of the movable mold halves 20 and the fixed center mold section 1. As shown in FIGS. 2 and 3, in this initial stage of the inventive process, the side/body mold elements 2, 3 and the bottom 4 and top 5 mold elements of the movable mold halves 20 are displaced axially away from the fixed center mold section 1 (i.e., by the first set of hydraulic cylinders 6) to allow the thermoplastic material to enter the annular recesses 40 between the fixed mold section 1 and the side/body mold elements 2, 3 of the movable mold halves 20.

Figure 4:
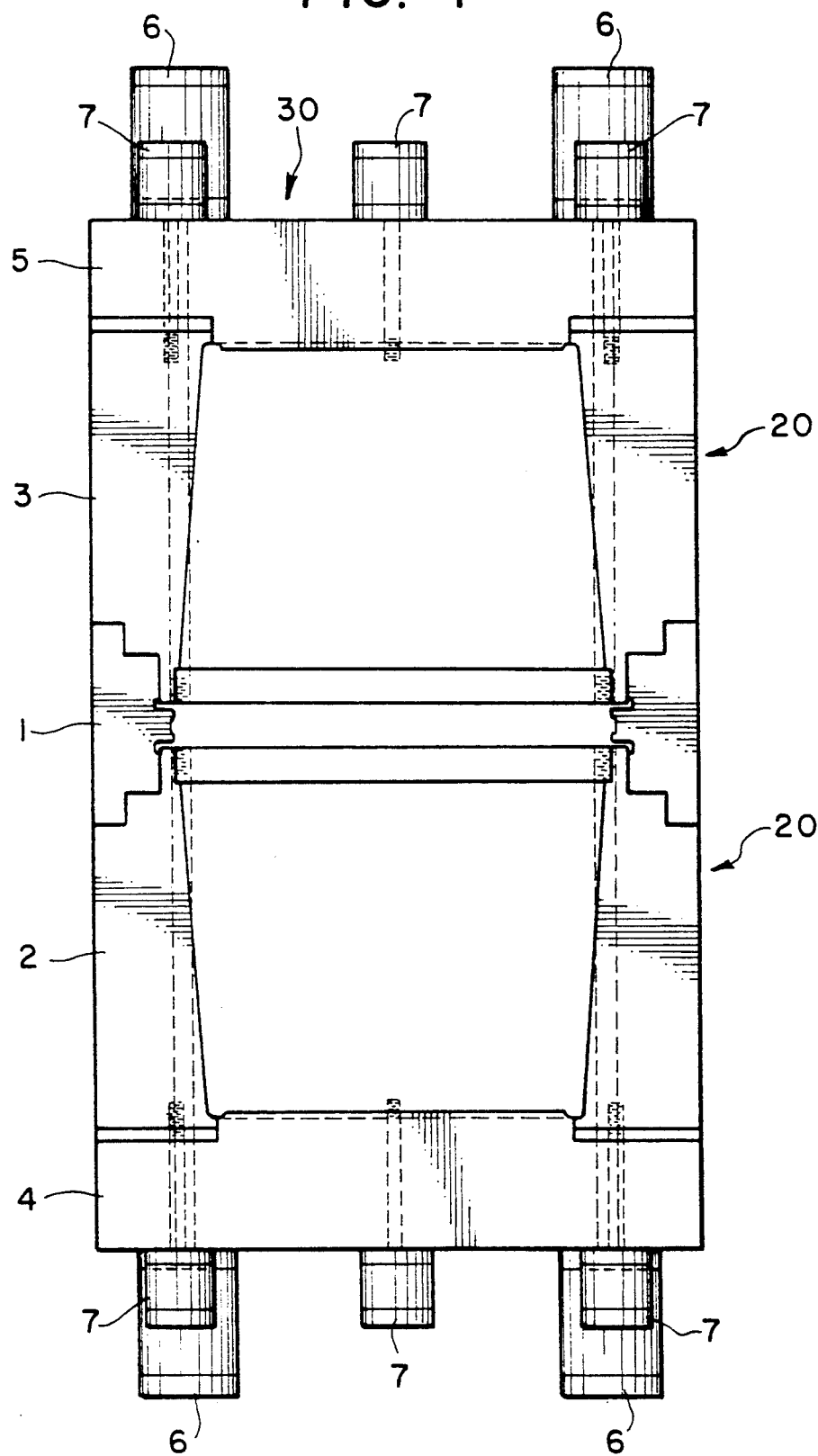
FIG. 4 is a side elevational view of the molding apparatus taken along parting line 2—2 of FIG. 1 showing the first set of hydraulic cylinders 6 (i.e., connecting the bottom 4 and top 5 elements of the movable mold halves to the fixed central mold element 1) fully retracted.
Figure 5:
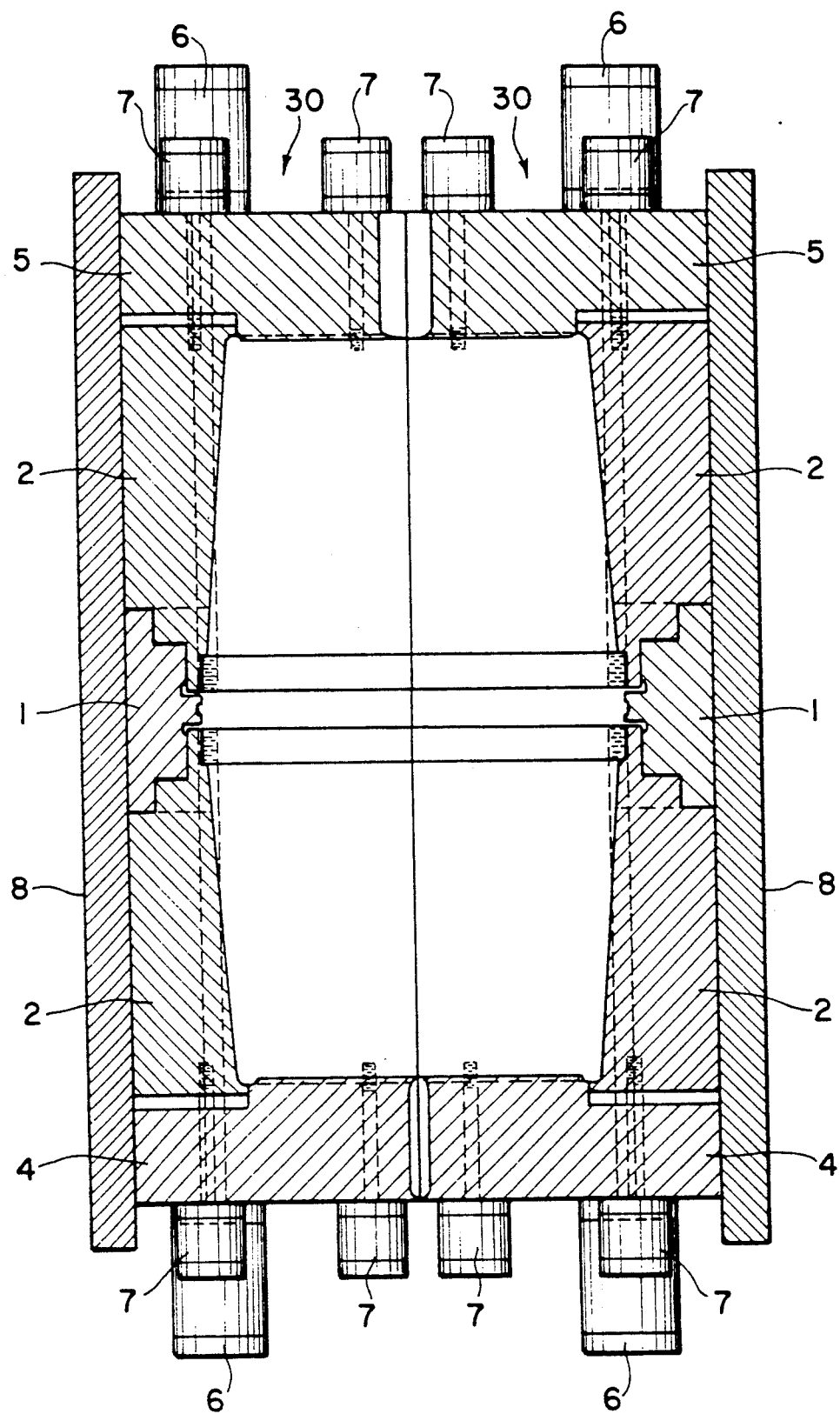
FIG. 5 is a side elevation view in cross section along line 3—3 of FIG. 1 with the mold components in the same position as in FIG. 4.

In the second stage of the process, while the thermoplastic material is still moldable, the two movable mold halves 20 (i.e., top 5 and side/body element 3; and bottom 4 and side/body element 2) are simultaneously moved in an axially direction toward the fixed center section 1. As shown in FIGS. 4 and 5, this movement of the mold sections causes the thermoplastic material within the annular recess 40 to fold over and contact itself. The pressure exerted upon the two folded-over/joined layers of material combined with the residual heat in the material substantially bonds the two layers of thermoplastic material together to form an integral thickened flange 60 which is substantially twice as thick as a single layer of blow-molded material. As seen FIG.

6, the thickened flanges 60 preferably each have a thickened radial flange 61 and a thickened axial lip 62.

As noted above, the bonding of the layers of thermoplastic material/creation of the thickened flanges 60 preferably occurs while the thermoplastic material is still moldable. If necessary, auxiliary heating of the mold elements may be utilized to facilitate this bonding. Preferably, however, auxiliary heating is not used. Secondary heating of the thermoplastic material is preferably avoided since an additional "heating/setting" history may be imparted to the material during reheating, thereby weakening the resultant containers. Furthermore, although it is also possible to differentially heat some sections of the mold (see, e.g., U.S. Pat. No. 4,117,062 to Uhlig, column 2, lines 45-56), this is preferably also avoided in order to minimize machinery complexity and cost. Rather, the natural heat retention of the thermoplastic material and the speed of the mold elements will preferably be sufficient to ensure good bonding of the two layers of material forming the thickened flanges 60.

As will be well known to those of skill in the blow molding art, the particular time necessary for each step (and the total cycle time required to make each pair of containers 10) will vary widely and depend upon such variables as container size, wall thickness, mold temperature, material molded, etc. In general, however, because the thickened flanges of the present containers are preferably made by simultaneous movement of the movable mold halves 20 rather than with sequential movement, at a minimum, it is expected that the inventive process and apparatus will have equivalent cycle times relative to those achieved with prior art devices.

Figure 7:
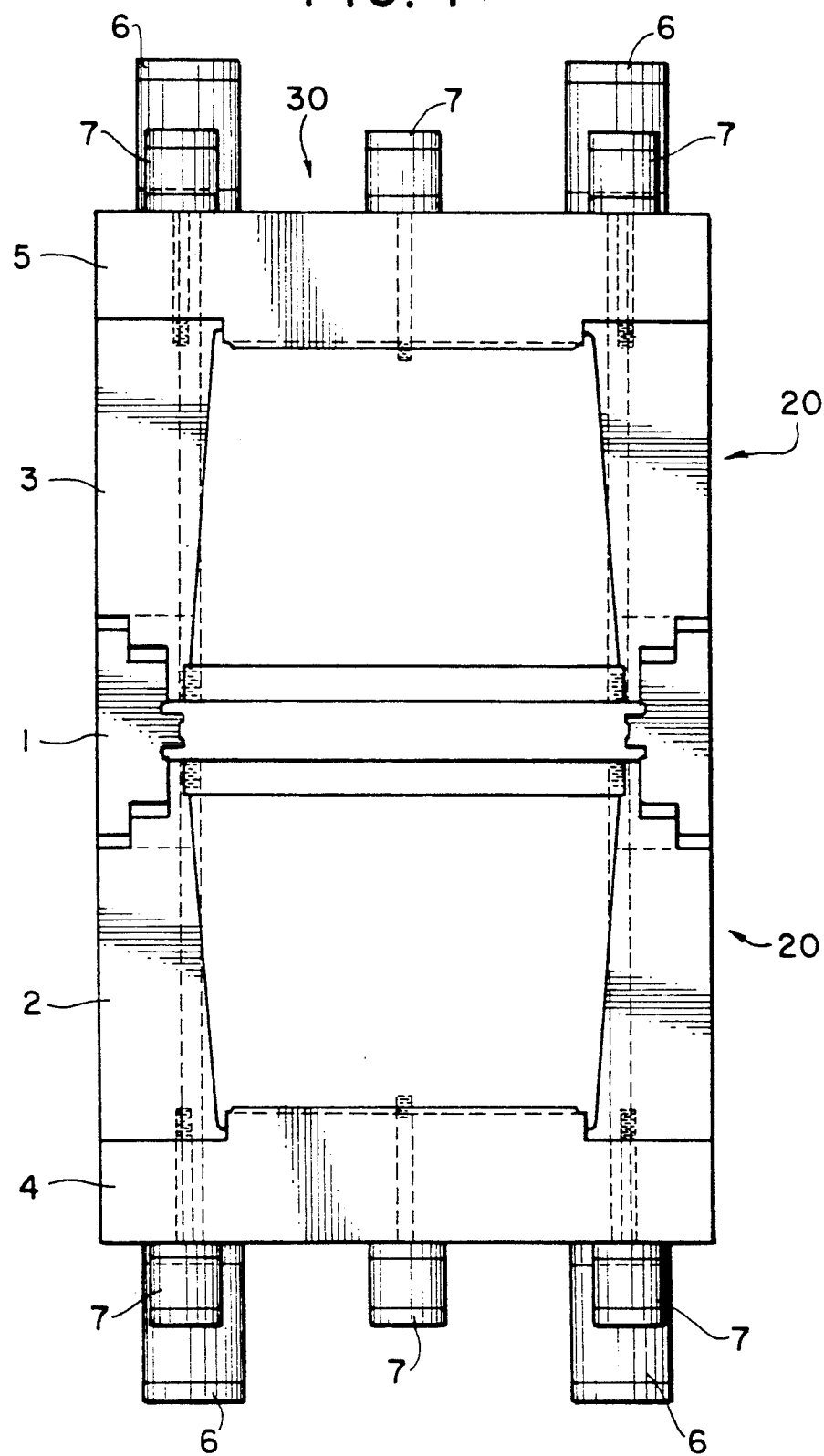
FIG. 7 is a side elevational view of the mold apparatus along parting line 2—2 of FIG. 1 showing the second set of hydraulic cylinders 7 (i.e., connecting the top 5 and bottom 4 elements of the movable mold halves to the respective side/body elements of the movable mold halves) fully retracted.
Figure 8:
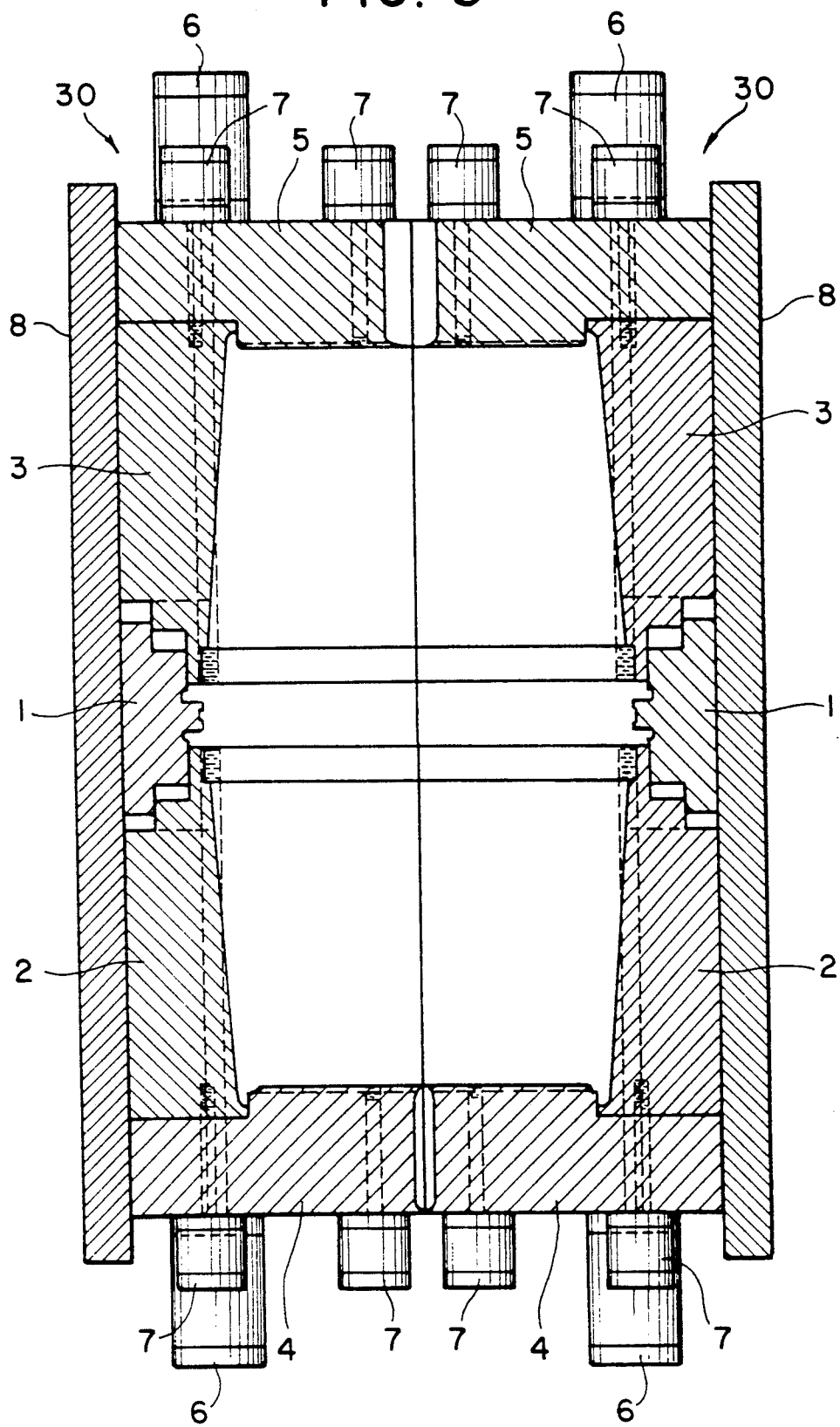
FIG. 8 is a side elevation view in cross section taken along line 3—3 of FIG. 1 with the mold components positioned as per FIG. 7.

In the third step of the process, after suitable cooling time to allow setting of the material (cooling times vary widely depending upon such factors as the size of the containers being molded, the type of thermoplastic material being used, etc., but, for example, when the inventive apparatus is used to mold ten-gallon flower pots, a cooling time of about ten to fifteen seconds has been found to usually be sufficient), the air pressure in the mold chamber is allowed to dissipate (i.e., from 60 to 150 psi—used to inflate the parison—down to about atmospheric pressure). As shown in FIGS. 7 and 8, the side/body elements 2, 3 of the movable mold halves 20 are then retracted (i.e., moved axially away from the center section 1—allowing clearance for the axial lips 62 of the thickened flanges 60 relative to the side mold elements 2,3). As can be seen by comparing FIGS. 4–5 with FIGS. 7–8, this movement is accomplished by retracting the second set of hydraulic cylinders 7.

Thereafter, as shown in FIG. 9, the two halves of the molding apparatus 30 are opened (i.e., along parting line 2—2) and the containers 10 are released from the mold chamber 50 with the tail or pinch tab 90 (and potentially also, second tail 91) still attached. After the joined pair of containers 10 has been removed from the mold cavity 50, the bottom mold sections (i.e., top 5 and bottom 4) are retracted axially away from the center section 1 (by extending the first set of hydraulic cylinders 6) and the side/body sections 2, 3 of the movable mold halves 20 are extended away from the corresponding bottom 4, 5 sections of the movable mold halves 20 (i.e., by extending the second set of hydraulic cylinders 7) in preparation for the next operating cycle (i.e., the molding apparatus is returned to the configuration of FIGS. 2-3).

Post-molding processing and handling of the containers 10 is facilitated by the preservation of the tail 90 of material. The containers 10 will typically need to be mechanically conveyed to a trimming machine to separate the two molded containers (i.e., somewhere within the thermoplastic material between the two intermediate portions of material 40—thickened flanges 60) and, in the case of flower pots, drill drain holes. The tail 90 of material may allow this transport to be accomplished without touching the thermoplastic material of the containers 10 (which, although no longer moldable, may still be tacky, easy to mar and easily collapsible).

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited to only the claims appended hereto and the equivalents thereof.

I claim:

1. A molding apparatus for producing containers having thickened flanges from a blow-molded parison of moldable material, said molding apparatus being axially-divisible into two halves, each of said halves of said molding apparatus comprising:

(a) two movable mold halves, each of said movable mold halves comprising a mold element for forming the bottom of one of said containers and a mold element for forming the side or body section of one of said containers, said bottom and side mold elements of said movable mold halves being operatively connected with each other but also being movable relative to each other;

(b) a stationary central mold element positioned between said movable mold halves, the movable mold halves and stationary central mold elements of said two halves of said molding apparatus enclosing therewithin a mold chamber;

(c) first moving means for simultaneously moving said movable mold halves toward said stationary central mold element; and (d) second moving means for moving said side elements of said movable mold halves away from said stationary central mold elements without moving said bottom mold elements away from said stationary central mold elements, whereby, after said thickened flanges have been molded, said side mold elements of said movable mold halves may be retracted without severing a tail of material attached to said containers, said tail being formed when said halves of said molding apparatus close around said parison of thermoplastic material.

2. The molding apparatus of claim 1 wherein said first and second moving means are hydraulic cylinders.

3. The molding apparatus of claim 2 wherein said hydraulic cylinders forming said first moving means are affixed to said stationary central molding element and wherein each of said movable mold halves has a corresponding group of hydraulic cylinders corresponding to said first moving means, whereby the simultaneous movement of said mold halves towards said stationary central mold element is facilitated.

4. The molding apparatus of claim 1, further comprising at least one backing plate connected to said at least one of stationary central mold elements, but wherein said movable mold halves and said first and second moving means are free to move relative to said at least one backing plate.

5. The molding apparatus of claim 1 wherein said side elements of said movable mold halves are configured relative to said stationary central mold element such that said thickened flanges are substantially twice as thick as a single layer of blow-molded material and such that said thickened flanges each include thickened axial lips depending therefrom.

6. The molding apparatus of claim 1 wherein said side elements of said movable mold halves are configured relative to said stationary central mold element whereby, when said parison of thermoplastic material is blow-molded to conform to said mold chamber, an intermediate annular portion of blow-molded material corresponding to each of said mold halves will form between said side elements of said movable mold halves and said stationary central mold element, each of said intermediate annular portions of material comprising:
  (a) a lower radial surface formed by the blow-molded material overlying the longitudinally central-most surface of each of said side elements of each of said movable mold halves;
  (b) an upper radial surface formed by the blow-molded material overlying the corresponding exposed radial surfaces of said stationary central mold element relative to each of said corresponding mold halves which are the furthest away from the central axis of said mold chamber; and
  (c) an annular surface formed by the blow-mold material overlying the portions of the mold chamber connecting the corresponding upper and lower radial surfaces.

7. An apparatus for molding blow-molded material into a joined pair of containers, each of said joined containers having a thickened flange, said apparatus comprising:
  (a) a plurality of molding elements for enclosing therein a mold chamber for blow-molding and molding said material, said molding elements comprising:
    (i) a pair of molding elements for forming the bottom of one of said containers;
    (ii) a pair of molding elements for forming a side of one of said containers, each of said pair of side mold elements being operatively connected to a corresponding one of said pair of bottom mold elements; and
    (iii) a stationary central mold element positioned between said corresponding pairs of bottom and side mold elements;
      wherein said corresponding pairs of bottom and side mold elements are movable relative to said stationary central molding element along the longitudinal axis of said joined pair of containers; and
      wherein said side mold elements are configured with respect to said stationary central mold element to form an annular recess therebetween, with respect to each respective one of said joined pair of containers, said annular recess having a lower radial surface comprising the material overlying the uppermost surface of said respective side mold elements, an upper radial surface comprising the material overlying the lowermost radial surface of said stationary central mold element and an annular surface comprising the material overlying the respective annular surfaces of said stationary central mold element for each of said containers;
  (b) means for simultaneously moving said corresponding pairs of bottom and side mold elements together towards said stationary central mold element to form said thickened flanges; and
  (c) means for moving respective bottom mold elements relative to corresponding respective side mold elements.

8. The molding apparatus of claim 7 wherein said molding elements enclose therebetween a tail of material which is not blow-molded, said tail remaining attached to said pair of containers during formation of said thickened flanges.

9. The molding apparatus of claim 8 wherein said annular recess is configured to form a thickened flange which is substantially twice as thick as a single layer of blow molded material.

10. The molding apparatus of claim 9 wherein each of said annular recesses is configured to form a thickened flange having a thickened axial lip depending therefrom.

* * * * *